(12) United States Patent
Sadat-Shojai et al.

(10) Patent No.: US 8,357,732 B2
(45) Date of Patent: Jan. 22, 2013

(54) METHOD FOR PRODUCTION OF BIOCOMPATIBLE NANOPARTICLES CONTAINING DENTAL ADHESIVE

(76) Inventors: Mehdi Sadat-Shojai, Tehran (IR);
Mohammad Atai, Tehran (IR);
Azizollah Nodehi, Tehran (IR)

( * ) Notice: Subject to any disclaimer, the term of this patent is extended or adjusted under 35 U.S.C. 154(b) by 317 days.

(21) Appl. No.: 12/723,649

(22) Filed: Mar. 14, 2010

(65) Prior Publication Data
US 2010/0166680 A1    Jul. 1, 2010

Related U.S. Application Data

(60) Provisional application No. 61/261,158, filed on Nov. 13, 2009.

(51) Int. Cl.
| A61L 27/32 | (2006.01) |
| C01B 25/32 | (2006.01) |
| A61K 33/42 | (2006.01) |
| A61K 6/033 | (2006.01) |
| A61K 6/083 | (2006.01) |

(52) U.S. Cl. ....... 523/116; 523/118; 427/2.27; 423/308; 424/602; 106/35

(58) Field of Classification Search ................. 523/116, 523/118; 427/2.27; 423/308; 424/602; 106/35
See application file for complete search history.

(56) References Cited

U.S. PATENT DOCUMENTS

| 5,858,318 | A | * | 1/1999 | Luo | 423/308 |
| 6,013,591 | A | * | 1/2000 | Ying et al. | 501/1 |
| 6,147,137 | A | * | 11/2000 | Jia | 523/118 |
| 7,153,482 | B2 | * | 12/2006 | Noerenberg et al. | 423/301 |
| 2006/0247330 | A1 | * | 11/2006 | Takano et al. | 523/116 |
| 2008/0220148 | A1 | * | 9/2008 | Clarkson et al. | 427/2.27 |

* cited by examiner

*Primary Examiner* — Michael Pepitone
(74) *Attorney, Agent, or Firm* — Barry Choobin; Choobin & Choobin Consultancy

(57) ABSTRACT

A method of synthesizing hydroxyapatite nanorods, having high purity, high crystallinity and high aspect ratio is disclosed here. In one embodiment, high crystalline hydroxyapatite nanorods with relatively stoichiometric structure are prepared via hydrothermal method at 200° C. and under moderate acidic conditions. The synthesized hydroxyapatite nanorods have a diameter of 30-95 nm, a length of 850-1400 nm with an average aspect ratio of 24, degree of crystallinity of 73% and stoichiometry ratio of 1.69. Further it discloses the use of HAp in dental adhesive. The dental adhesive comprising synthesized HAp shows improved diametral tensile strength and high microshear bond strength. Energy dispersive X-ray mapping confirmed the uniform distribution of nanorods in the adhesive matrix. The synthesized hydroxyapatite nanorods have high colloidal stability in the dental adhesive solution. The nanorods are well dispersed and protected from aggregation by their high surface charges confirmed by zeta potential measurement.

14 Claims, 13 Drawing Sheets

METHOD FOR PRODUCTION OF BIOCOMPATIBLE NANOPARTICLES CONTAINING DENTAL ADHESIVE

CROSS-REFERENCE TO RELATED APPLICATION

This application claims the priority under 35 USC 119(e) of U.S. Provisional Application Ser. No. 61/261,158, filed Nov. 13, 2009, which is included by reference herein.

The present invention for international filing is sponsored by The Iranian Nanotechnology initiative Council.

BACKGROUND

1. Technical Field

The embodiments herein relates to a method of producing hydroxyapatite nanoparticles with various structural and morphological properties in general and in particular, to a method to improve the bond strength of a new dental adhesive to dentin by including the hydroxyapatite nanorods as biocompatible fillers with high purity, high crystallinity, high aspect ratio and high colloidal stability.

2. Description of the Related Art

Hydroxyapatite (HAp) having a chemical formulae ($Ca_{10}(PO_4)_6(OH)_2$) is one of the most biocompatible materials because of its similarity to the main mineral component of the hard tissues of human body such as bone, dental enamel and dentin. Due to its biocompatibility, bioactivity, low solubility in water and ability to replace toxic ions in human body, HAp has widely been used in the biomedical applications. Since some applications of the HAp nanoparticles, for example, load-bearing orthopedic and dental applications are limited by the low mechanical properties of the HAp nanoparticles, numerous studies have been made to improve the mechanical properties using one-dimensional growth of the HAp crystals to form the nanorods.

Several methods such as solid-state synthesis, hydrothermal method and solvothermal method have been reported for the synthesis of hydroxyapatite nanorods. Although the preparation of the fibrous HAp particles is well known, the synthesis of nano-sized particles with high aspect ratio, appropriate stoichiometry and high crystallinity properties remains still as an interesting challenge.

Hydrothermal method is the most frequently used method for one-dimensional growth of HAp. However, the published data in the literature lead to some discrepancies on the optimum experimental conditions. For instance, some studies have shown that the fibrous HAp is synthesized at acidic or approximately at neutral conditions and some others show that these nanofibers are synthesized under alkaline conditions. Moreover, only few experimental parameters were evaluated in each study.

Dental adhesives, especially one step systems, are now widely used in restorative and artistic dentistry due to their conservative and generally aesthetic roles. In fact, the clinical performance of composite restorations partially depends upon the complete adhesion of the restorative composites to enamel and dentin. For enamel, the acid-etch procedure is performed usually and successfully. Dentin, however, is a hydrated biological composite, including inorganic materials (mostly hydroxyapatite), organic materials (collagen) and water, with properties that vary significantly with location. Moreover, the dentin contains fluid-containing dentinal tubules which make a dynamic and wet substrate for the bonding agents and a more complicated condition in comparison to the enamel.

Recently nanoparticles have been used in the formulation of the restorative composite systems. With the aim of improving physical and mechanical properties, nanoparticles have also been included into the dental adhesives. The filler particles are used in the dental adhesives to fortify the bond strength of the adhesive to the dentin by penetrating into the dentin tubules, decreasing the polymerization shrinkage and increasing the elastic modulus of the adhesive layer. Because of their very small sizes, nanoparticles are able to penetrate well into the dentinal tubules along with the adhesive matrix resin thereby providing a composite adhesive layer with improved properties.

Although the researchers have studied the effect of various functional or nonfunctional micro and nano-fillers on the dental adhesives for several years, the type and concentration of these fillers still remains a matter of concern. For example, the U.S. Pat. No. 6,620,861 B1 issued in 2003, disclosed the production of various organic and inorganic fillers for using in a dental composition. However, many of the prepared filler dental adhesives are very much process sensitive, show limited colloidal stability (for using in dental adhesives) due to the dilute characteristic of the adhesives and may increase the toxicological risk of the adhesive.

As the major component of an inorganic material of a tooth is hydroxyapatite, it might be a promising material for the preparation of new dental adhesives with improved mechanical and biological properties. Although HAp nanoparticles are currently used as coatings in orthopedic and dental implants, no information is available on the effect of hydroxyapatite on dentin-bonding systems.

Several patents such as U.S. Pat. No. 4,046,858 issued in 1997, disclosed the synthetic route to produce the crystalline HAp for production of various implants such as dental composition. However, the patents do not reveal the properties of such dental composition. Moreover, it has also been reported (in an article entitled Hydrolytic stability of experimental hydroxyapatite-filled dental composite materials by Domingo C et al., and published in Dent. Mater, 2003 19(6):478-486.) that a composite material containing a surface modified nanoparticle of hydroxyapatite is unsuitable for clinical performance.

The above mentioned shortcomings, disadvantages and problems are addressed herein and which will be understood by reading and studying the following specification.

OBJECT OF THE EMBODIMENTS

The primary objective of the embodiments herein is to provide a dentine adhesive or a dental composition having improved properties and comprising biocompatible inorganic filler such as Hydroxyapatite (HAp).

Another objective of the embodiments herein is to provide a low cost, simple method of producing such composition in less time.

Yet another objective of the embodiments herein is to synthesize nano-sized hydroxyapatite having various structural and morphological properties.

Still further objective of the embodiments herein is to improve the bond strength of a new dental adhesive to dentin by including the hydroxyapatite nanorods, as biocompatible fillers having high purity, high crystallinity, high aspect ratio and high colloidal properties.

These and other objects and advantages of the embodiments herein will become readily apparent from the following detailed description taken in conjunction with the accompanying drawings.

SUMMARY

The embodiments herein provide a method of synthesizing the hydroxyapatite nanorods, having high purity, high crystallinity and high aspect ratio. In one embodiment, a high crystalline hydroxyapatite nanorods with relatively stoichiometric structure is prepared via hydrothermal method at 200° C. and under moderate acidic conditions. The generated hydroxyapatite nanorods are synthesized to have diameters of 30-320 nm and lengths of 850-1400 nm with an average aspect ratio of 24° of crystallinity of 73% and stoichiometry ratio of 1.69. Thus a dental adhesive comprising synthesized HAp showed improved diametral tensile strength and high micro-shear bond strength. Energy dispersive X-ray mapping confirmed the uniform distribution of the nanorods in the adhesive matrix. The synthesized hydroxyapatite nanorods have high colloidal stability in the dental adhesive solution. Indeed, the nanorods are well dispersed and protected from aggregation by their high surface charges confirmed by the zeta potential measurement. Further it also discloses the use of HAp in a dentine adhesive for a dental application.

According to one embodiment, a method of synthesizing hydroxyapatite nanorods (HAp) having high purity, high crystallinity, high aspect ratio comprises preparing stoichiometric ionic solutions of 0.1 or 0.03M calcium ion ($Ca^{2+}$) and 0.1 or 0.03M phosphate ion ($HPO_4^{2-}$) by dissolving Ca $(NO_3)_2 \cdot 4H_2O$ salt and $(NH_4)_2HPO_4$ salt in deionized water respectively. Moreover, said phosphate ion solution is added in drop wise into said calcium ion solution with gentle and continuous stirring of reaction mixture. A molar ratio of Ca/P in said stoichiometric ionic solution is adjusted to about 1.67. A chemical precipitation reaction of said reaction mixture is performed under alkaline and acidic conditions to obtain a HAp precursor suspension in water; wherein said alkaline condition is obtained by adding urea or ammonia solution to said reaction mixture. A hydrothermal treatment of said HAp precursor suspension in water is performed in a 100 ml autoclave at a temperature about 90° C.-200° C. for 60 hrs to obtain HAp nanoparticles and nanorods. Said HAp nanoparticles and nanorods are washed in a deionized water. A filtration process of said HAp nanoparticles and nanorods is performed by centrifugation to obtain a nanosized HAp. Said nanosized HAp is crushed to powder form.

Said HAp nanoparticles and nanorods with different structural and morphological properties are obtained by varying the concentration of reactants, temperature and pH of said reaction mixture. For example, said reactants are phosphate ion, calcium ion and urea. Said structural and morphological properties include diameter, length, aspect ratio and degree of crystallinity of said HAp nanorods. Said HAp nanoparticles and nanorods generally have a diameter of about 35-320 nm; preferably a diameter of 30-95 nm and more preferably a diameter of less than 100 nm. Said HAp nanorod preferably has length of about 850-1400 nm. Said HAp nanorod preferably has an aspect ratio of about 24. Said HAp nanorod preferably has a crystallinity of about 73%.

According to one embodiment, a dental adhesive composition comprises 0.2-0.5 wt % of HAp nanorods (with respect to the total adhesive resin); 40 wt % of Ethanol; 12 wt % of 1,6-bis-[2-methacryloyloxy ethoxycarbonylamino]-2,4,4-trimethylhexane (UDMA); 14 wt % of 2,2-bis[p-(2-hydroxy-3-methacryloxypropoxy)phenyl]propane (Bis-GMA); 26 wt % of 2-hydroxyethyl methacrylate (HEMA); and 8 wt % of 2-Ethyl-2-(hydroxymethyl)-1,3-propandiol trimethacrylate (TMPTMA) mixed in given proportions to achieve preset mechanical, chemical strength.

The composition further comprises a photo initiating system wherein said photo initiating system is CQ/DMADME. The HAp nanorods are synthesized using the given process. The synthesized HAp is colloidal stable in said composition. The preset mechanical strength is diametral tensile strength of at least 34 MPa. The preset mechanical strength is flexural strength of at least 51 MPa. The HAp is included in 0.2 wt % to improve the bond strength to about 22 MPa.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

Single Bond 2 (3M ESPE, USA) is a commercially available dentin bonding agent. The vertical bars represent the values of the standard deviation.

Although specific features of the embodiments herein are shown in some drawings and not in others. This is done for convenience only as each feature may be combined with any or all of the other features in accordance with the embodiments disclosed herein.

DETAILED DESCRIPTION OF THE PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
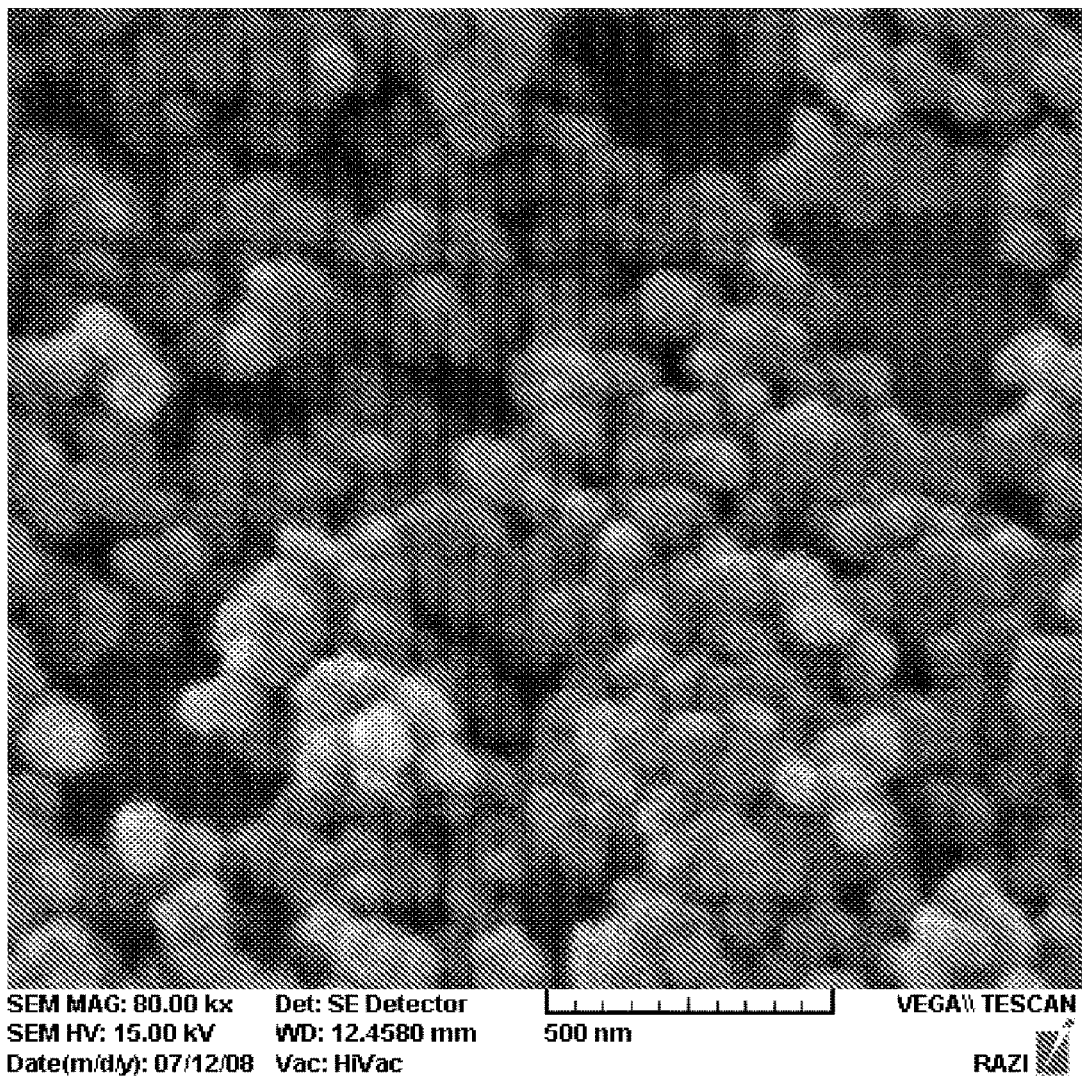
FIG. 1 is a SEM photomicrograph of the spherical HAp particles synthesized at a temperature of 200° C., pH of 10, reactant concentration of 0.1 M and in the presence of urea.
Figure 2:
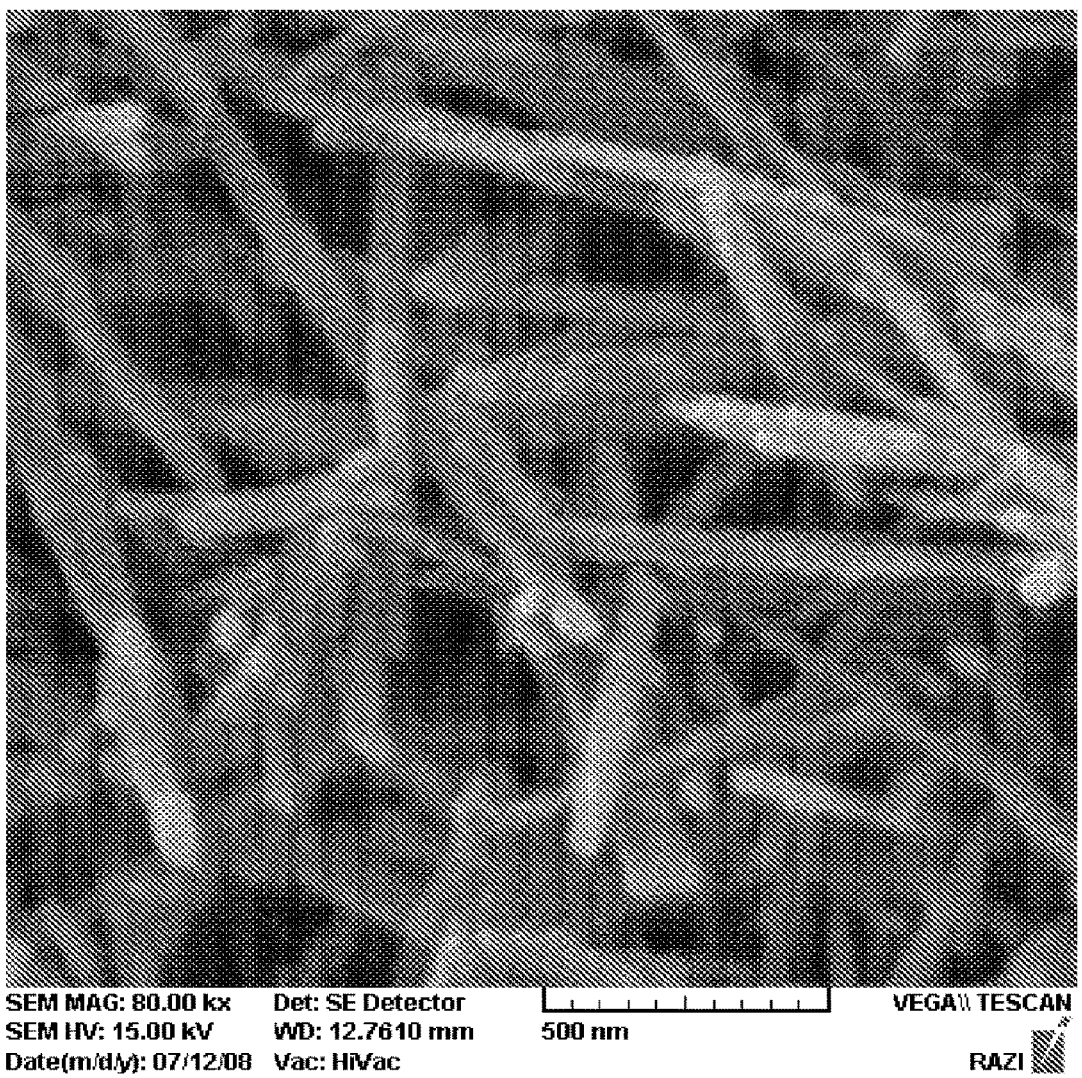
FIG. 2 is a SEM photomicrograph of the rod-like HAp particles synthesized at a temperature of 200° C., pH of 5, reactant concentration of 0.1 M, without using urea.
Figure 3:
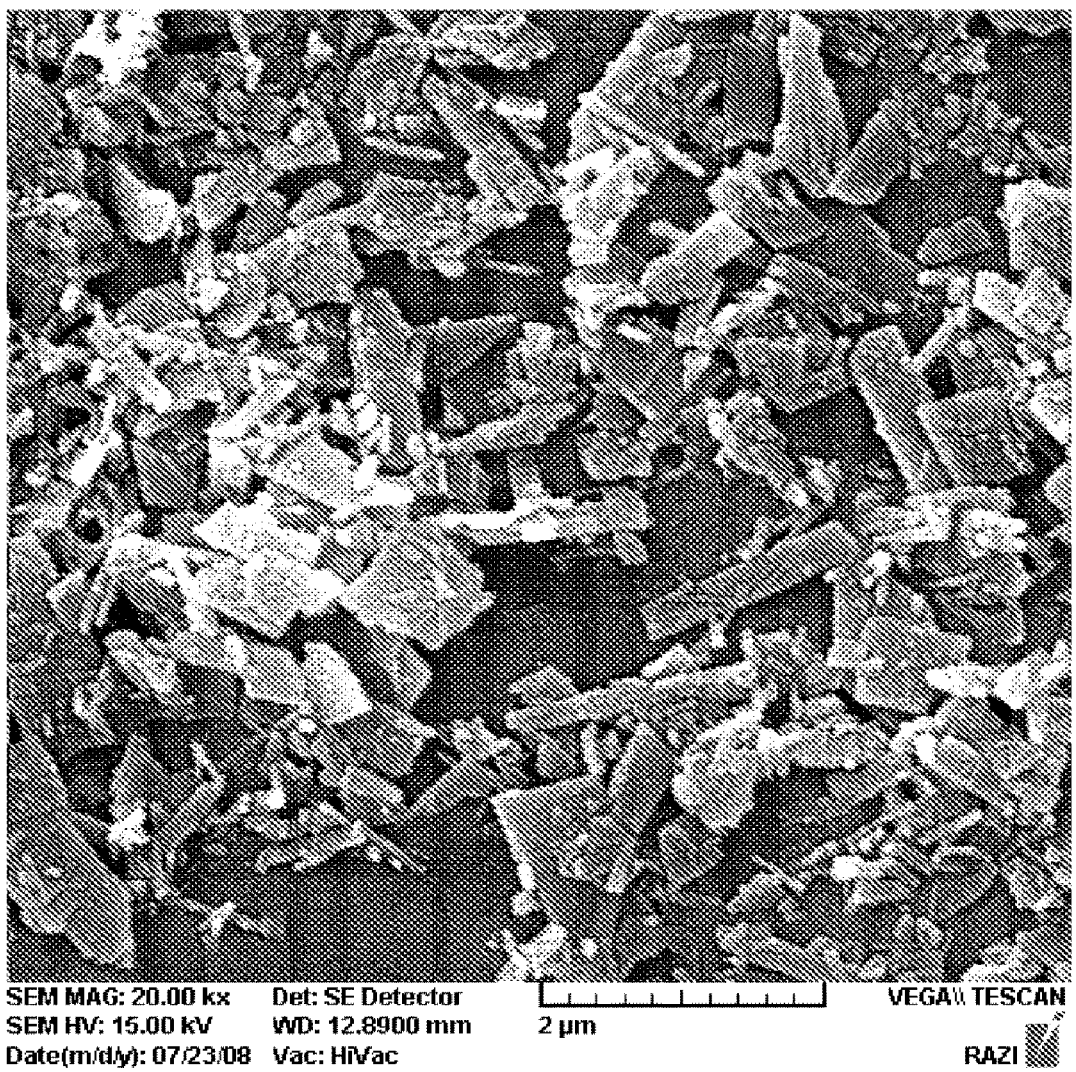
FIG. 3 is a SEM photomicrograph of the plate-like HAp particles synthesized at temperature of 900° C., pH of 5, reactant concentration of 0.1 M, and in the presence of urea.

The embodiments herein disclose a method or process of producing nanosized hydroxyapatite (HAp) whose particles have various structural and morphological properties. The factors that may influence the characteristics of HAp, are evaluated to produce HAp nanoparticles having various characteristics suitable for using in dental composition or adhesive composition. The HAp with various structural and morphological properties and sizes (such as plate-like, spherical and rod-like nanoparticle) are synthesized under the hydrothermal conditions. The variables include reaction temperature, pH, reactants concentration and presence of urea. FIGS. 1 to 3 show typical morphologies of three HAp nanoparticles synthesized in the embodiments herein.

Method of Synthesizing HAp

The method of synthesizing HAp comprises preparing a solution of $Ca^{2+}$ and $HPO_4^{2-}$ with various concentrations by dissolving an appropriate amount of $Ca(NO_3)_2 \cdot 4H_2O$ and $(NH_4)_2HPO_4$ salt in deionized water respectively. The phosphate ion solution is then added in drops into the calcium ion solution under continuous and gentle stirring process.

The stoichiometry of the calcium and phosphate ion solutions is adjusted so that the theoretical molar ratio of Ca/P is to be kept close to 1.67. For the chemical precipitation experiments which are performed under alkaline conditions, the pH of the mixture is adjusted at 10 by the addition of ammonia and for the other suspensions, pH is kept constantly at 5.6.

Instead of using ammonia, urea is used in another embodiment of the present invention for adjusting pH value. The urea is added into the mixture at a concentration equal to that of calcium ion at the beginning of the precipitation reactions and the solution is stirred for half an hour to ensure that the urea is dissolved completely. The HAp precursor suspension in water is transferred to a 100 ml autoclave (pressure vessel) and treated hydrothermally at 90° C. or 200° C. for 60 hrs. The final product is washed four times with deionized water, filtered by centrifugation, dried at 60° C. and crushed into a powder form.

The reaction parameter including reactant concentrations, pH, temperature of the hydrothermal treatment and presence of urea is evaluated through an experimental design to understand its effect on the physical property of the final product. The property of the final product HAp, for example, its diameter, length, aspect ratio, degree of crystallinity, and Ca/P ratio for different above mentioned parameter is recorded and subjected to ANOVA analysis. Among the selected variables, temperature and pH are found to be the most significant parameters affecting the hydroxyapatite structural and morphological properties.

In the embodiments herein, HAp nanoparticles with diameters generally ranging from 35 to 320 nm, preferably 30-95 nm and more preferably less than 100 nm are produced. The results show that the diameter of nanoparticles increases slightly with increasing concentration of the reactants. Moreover it is found that diameter of nanoparticles decreases with increasing pH values. In fact, the samples are formed in nearly spherical shape under basic conditions suggesting that the crystal growth of HAp depends on the pH of the reaction mixture and there is not any preference for an oriented crystal growth at basic conditions. This observation is in agreement with some studies and is in disagreement with some others.

A modified method to synthesize HAp at basic conditions includes the addition of urea instead of ammonia in precipitation reaction which leads to more homogenous and biocompatible precipitation and further transformation to HAp, due to the variation in pH during the hydrolysis of urea. During the hydrolysis process, the carbonate ions ($CO_3^{2-}$) are released and included into the HAp crystal structure as it happens in human bones. According to the results, the usage of urea in the reaction recipe increases the mean diameter of the nanoparticles. This can be related to the coordination of urea with $Ca^{2+}$ ions in the starting mixture in which, the rate of formation of HAp is controlled by adjusting the release of $Ca^{2+}$ ion.

The formation of HAp crystals includes two stages. The first stage is the nucleation (a step of reaction of ions) and the second stage is the growth of nucleates (step of hydrothermal treatment). Urea only affects the characteristics of HAp at the first stage. The complex of urea-$Ca^{2+}$ prevents the $Ca^{2+}$ ions from reacting quickly with the other reactants thereby decreasing the number of nucleation sites. By decreasing the number of the nucleus, the nanoparticles are allowed to grow in size so that the diameter of nanoparticles is increased. In other words, the small crystallites are permitted to grow into large particles with the prolonged duration. On the other hand, the results indicate that the diameter of nanoparticles decreases slightly with the increase in temperature. The numerical data reveals that the synthesized fibrous HAp particles have mean lengths up to 1400 nm. The pH of the reaction mixture has significant effect on the mean length of fibrous nanoparticles.

Interactions between the presence of urea and hydrothermal temperature, interactions between reactants concentrations and pH and the reactants concentrations are also among the more influencing effects. The results indicate that the mean length of nanoparticles increases by increasing the concentration of the reactants similar to that for the mean diameter of the nanoparticles. According to the results, the mean length of nanoparticles steeply decreases with the increasing pH values. Variation in pH value has a pronounced influence on the length of nanorods. This can be explained by the higher tendency of nucleates to grow at c-axis in moderate acidic conditions. At lower pH, calcium and phosphate ions are preferentially absorbed on the particles at the c-axis and a unidirectional growth of the particles leads to the formation of fibers. These results are in agreement with those of Zhang et al. They showed that the HAp whiskers with uniform morphology could be prepared by the precipitation of particles in moderately acidic solution during a hydrolysis process. (Zhang H et al., Morphology and formation mechanism of hydroxyapatite whiskers from moderately acid solution, *materials research,* 20026: 111-115).

Moreover, there is essentially no difference in the mean length of fibrous nanoparticles in the presence or absence of urea, within the experimental range under study. This result may be due to the decomposition of urea at higher temperatures, i.e. in the stage of hydrothermal treatment, in which crystals grow. The mean length increases slightly with increasing hydrothermal temperature. This effect can be attributed to the tendency of the particles for growing at one direction at higher temperatures.

The net strength of a given fiber is predominantly determined by its length to diameter ratio. It is well known that for a given fiber, higher values of the length to diameter (or width) ratio, the aspect ratio, result in improved strength of the fiber reinforced composites.

The embodiments herein indicate that the aspect ratio of the fibrous nanoparticles increases slightly by increasing the concentration of the reactants. In fact, the increase in length is higher than the increase in mean diameter so that the aspect ratio increases. When applying basic conditions, a diminishing trend is seen in both length and diameter. The results show that the decrease in the length of the fibrous nanoparticles due to increase in pH value is much higher and therefore, the particles are formed in nearly spherical form. Similar behavior has been reported by Liu et al. (The influence of pH and temperature on the morphology of hydroxyapatite synthesized by hydrothermal method, Liu J et al. *Ceram. Int.* 2003 29: 629-633). The results show that the aspect ratio decreases slightly in the presence of urea. When urea is used in the reaction recipe, the diameter of particles increased while the mean length of the particles remained unchanged, whereupon the aspect ratio is decreased. Moreover, as a result of decreasing in diameter and increasing in length, the aspect ratio increases as the hydrothermal temperature increases.

Figure 4:
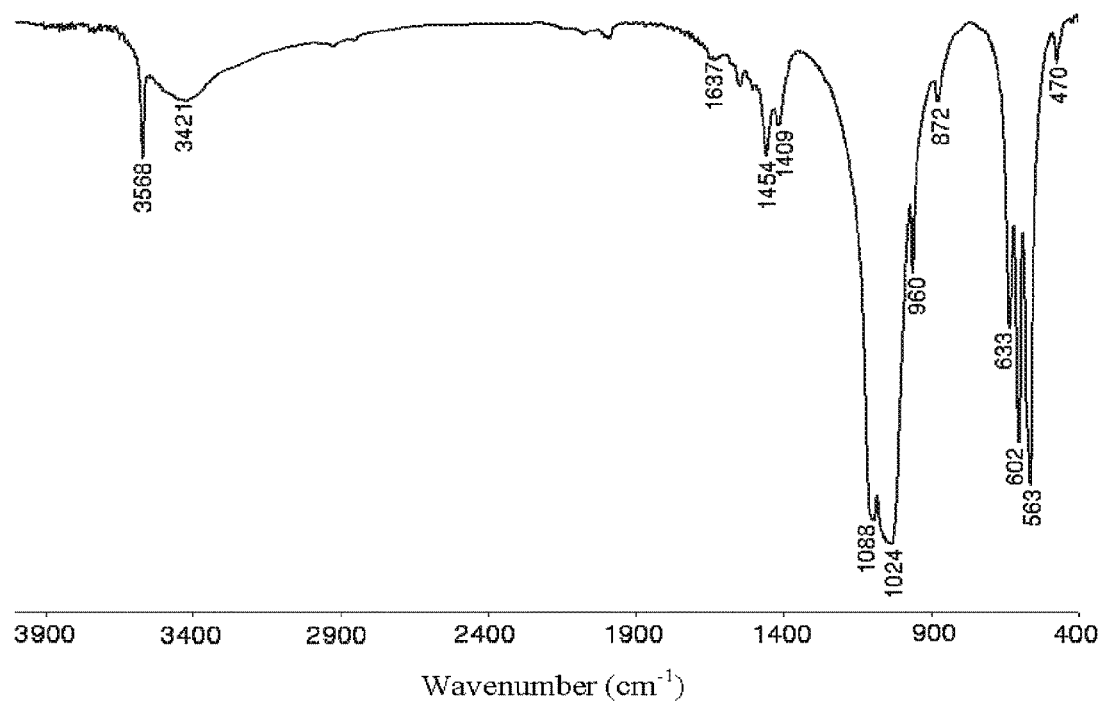
FIG. 4 is a FTIR spectrum of the HAp particle, corresponding to the sample given in the FIG. 2.

Fourier transform infrared (FTIR) absorption spectra of all samples confirmed the HAp structure in the samples (FIG. 4). The characteristic peaks for $PO_4^{3-}$ appear at about 1090, 1029, 602, 961, 566 and 473 $cm^{-1}$. A duplex peak at wave numbers of about 1415 and 1458 $cm^{-1}$ is attributed to the carbonate impurities in the structure of hydroxyapatite. The peaks at 3437 and 1637 $cm^{-1}$ are relevant to the bending modes of hydroxyl group in the adsorbed water, while the peaks at 3571 and 633 $cm^{-1}$ are assigned to the stretching vibration of the hydroxyl group in the crystalline structure of HAp.

Meanwhile the weak peak at about 873 $cm^{-1}$ demonstrates the presence of low amount of hydrogen phosphate in the crystalline structure of HAp. From the results, it can be seen that with the decrease in the degree of crystallinity, the intensity of absorption bonds appeared in the peaks at 3437 and 1637 $cm^{-1}$ is increased, while the intensity of bonds appeared in the peaks at 3571 and 633 $cm^{-1}$ is decreased. The change in the intensity of the aforementioned characteristic peaks could be used as an alternative to XRD patterns for determining the degree of crystallinity.

Figure 5:
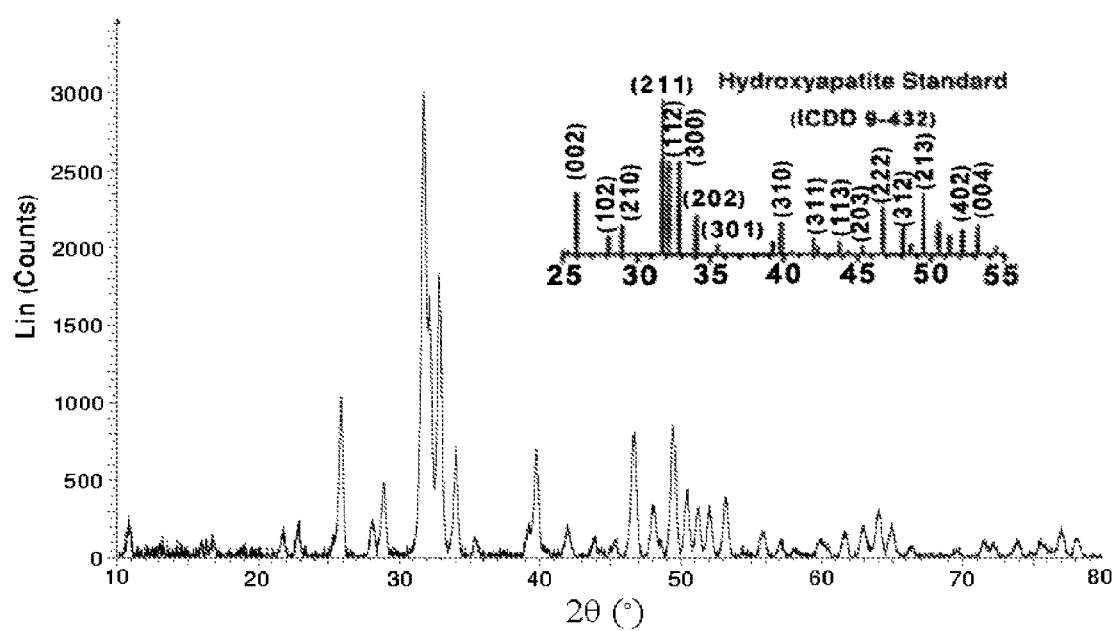
FIG. 5 is a typical XRD spectrum of the HAp particle, corresponding to the sample given in the FIG. 2. The inset represents the XRD ICDD standard for hydroxyapatite.

The crystalline phase of HAp has an important contribution in increasing the strength of the biomaterials reinforced by HAp. From the viewpoint of the crystal growth, each factor that decelerates the reaction rate of calcium and phosphate ions at the step of precursor preparation or accelerates the growth of the nucleate at the step of hydrothermal treatment causes to increase the crystalline fraction of HAp nanoparticles. The XRD patterns of all HAp samples are identified as HAp according to ICDD (International Centre for Diffraction Data) standard (PDF Card no. 9-432) and all peaks correspond to hexagonal crystal system of HAp (FIG. 5). The fraction of the crystalline phase in HAp nanoparticles is determined according to the following equation:

$$X_C = 1 - (V_{112/300}/I_{300})$$

Where $I_{300}$ represents the intensity of (300) diffraction peak, and $V_{112/300}$ represents the intensity of the valley between the peaks of (112) and (300). Various degrees of crystallinity ranging from 19.4 to 83.8% are synthesized in the embodiments disclosed herein.

The results show that no significant difference in the fraction of the crystalline phase is observed in HAps prepared at different reactant concentrations, within the experimental range studied. Moreover, the degree of crystallinity of the particles increases slightly with increasing pH value of the reaction mixture.

This increase in the degree of crystallinity can be attributed to the suppression of the competing phosphate hydrolysis reaction. In fact, at basic conditions, the concentration of $PO_4^{3-}$ (in comparison with $HPO_4^{2-}$ as well as $H_2PO_4$) is much higher, which may cause an increase in the rate of nucleation. According to the results, by using urea in the reaction recipe, the crystalline fraction in HAp nanoparticles is increased. This could be explained by the coordination of calcium ions with the urea molecules to form $Ca^{2+}$-urea complex in the starting reaction mixture. This complex can effectively control the growth of HAp at the step of precursor preparation by decreasing the $Ca^{2+}$ ion release so that the degree of crystallinity of the nanoparticles increases.

In other word, with the prolonged duration, the small crystallites are allowed to grow and increase the crystalline fraction in HAp nanoparticles. The temperature of hydrothermal treatment affects predominantly the crystalline phase fraction, crystallite size and as a consequence, specific surface area. The results show that the degree of crystallinity steeply increases with the increasing temperatures. This can be explained with the higher susceptibility of nucleates to grow at higher temperatures, which may be a consequence of the orientation along the planes (002) and (300).

Figure 6:
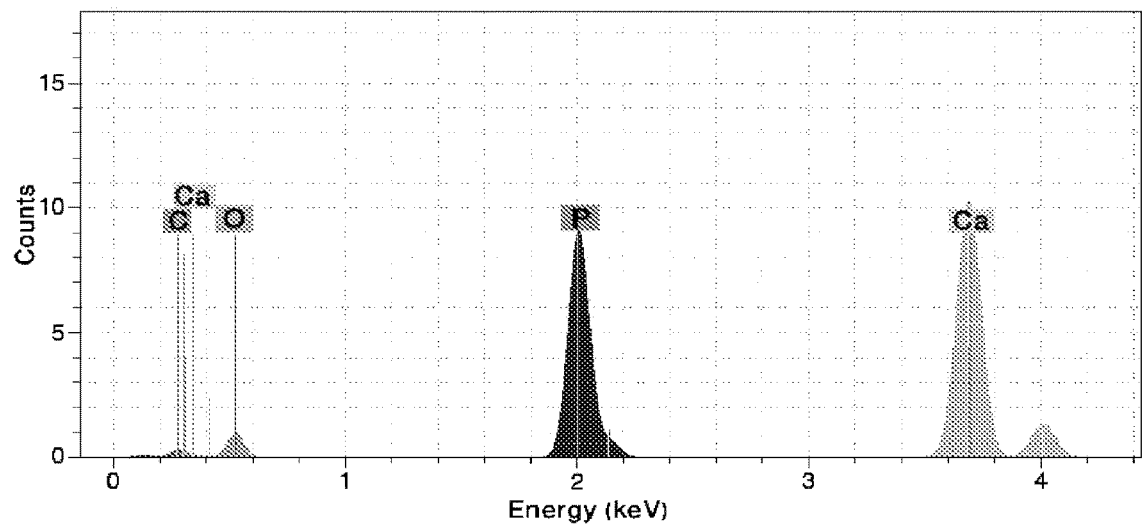
FIG. 6 is a typical EDXA spectrum of the HAp particle, corresponding to the sample given in the FIG. 2.

The Ca/P ratio of the HAp nanoparticles is determined as a measure of their stoichiometry. The measurement of this ratio was performed with energy dispersive X-ray analysis (EDXA). In a typical EDXA spectrum of the prepared HAp nanoparticles (FIG. 6), a phosphorus peak at 2.01 keV and two calcium peaks at 3.69 keV($K_a$) and 4.01 keV($K_b$) are observed. The results show that HAp particles produced in the embodiments disclosed herein have various Ca/P ratios ranging from 1.5 to 1.96. The results indicate that the Ca/P ratio of nanoparticles decreases slightly with the increasing concentration of the reactants.

Moreover, the Ca/P ratio of HAp nanoparticles increases slightly in the presence of urea. As mentioned earlier, urea decomposes completely with the increasing temperatures and produces carbon dioxide. The decomposition of urea and production of carbonate ions in aqueous solutions can be described by the following reactions:

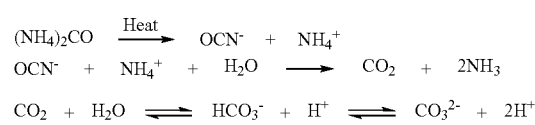

With constant calcium content, by increasing the carbonate concentration in the reaction mixture, the probability of phosphate absorption decreases and therefore, the Ca/P ratio increases.

On the other hand, the Ca/P ratio of HAp nanoparticles increases with the increasing temperatures. As mentioned above, this increase is related to the decomposition of the urea, at higher temperatures in which the absorption of the phosphate ions is suppressed by increasing the concentration of the carbonate ions.

In the embodiments herein, the effect of each process variable is experimentally determined for optimizing the synthesis conditions. According to the results, the pH value of reaction mixture and temperature of hydrothermal treatment have the highest influence on the special characteristics of HAp, among the studied factors. It is found that certain combinations of parameters make possible to produce relatively high quality particles, while other combinations can not provide good characteristics for HAp particles. To produce high crystalline stoichiometric particles with mean particle diameter of less than 100 nm and mean particle length of more than 1000 nm, the specific conditions found in this invention can be applied. In this case, high concentration, high hydrothermal temperature and low pH value should be maintained when urea is not used. Thus synthesized HAp nanorods were then incorporated into an experimental one-bottle dentin bonding system and the mechanical properties of the adhesive and micro shear bond strength to dentin are studied. The results are compared with those of a commercially available dentin bonding system. Accordingly, an experimental ethanol-based one-bottle dentin bonding is prepared. The details of the formulated adhesive mixture are provided in Table 1.

The synthesized HAp nanorods with weight ratios ranging from 0 to 5%, are dispersed into the adhesive solution and then homogenized by ultra sonification using a probe sonicator apparatus for 1 min. To prepare a single component light-cure formulation, CQ/DMADME photo initiating system and synthesized Hap nanorods are mixed with respect to the total adhesive resin at a weight ratio of 0.5:0.5. Finally, the prepared adhesive mixtures containing 0%, 0.2%, 0.5%, 1%, 2%, and 5% (by weight) of HAp nanorods are divided into two groups. The first group is used in microshear bond strength test. In the second group, the solvent of the adhesives is vacuum evaporated for 2 days in sub-ambient light to prepare mechanical test specimens of the bulk resins.

Inorganic fillers have recently been used in the composition of dental adhesives. Table 1 gives one of the possible compositions of such dental adhesives of the embodiments herein along with HAp as an inorganic filler.

TABLE 1

The Formulation of the adhesive used in this invention

| Materials | % Weight |
|---|---|
| Ethanol | 40 |
| 1,6-bis-[2-methacryloyloxyethoxycarbonylamino]-2,4,4-trimethylhexane (UDMA) | 12 |
| 2,2-bis[p-(2-hydroxy-3-methacryloxypropoxy)phenyl] propane (Bis-GMA) | 14 |
| 2-hydroxyethyl methacrylate (HEMA) | 26 |
| 2-Ethyl-2-(hydroxymethyl)-1,3-propandiol trimethacrylate (TMPTMA) | 8 |

The colloidal stability measurement of the composite is carried out using a separation analyzer (LUMiReader® 416.1, LUM, Germany). The specimen is prepared by dispersing 0.2 wt % of HAp nanorods in the adhesive solution and sonicating for 2 min.

Figure 7:
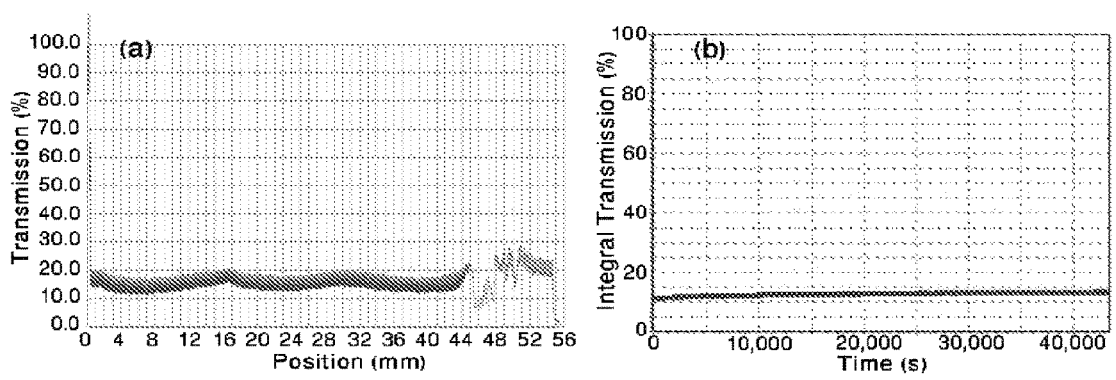
FIG. 7 is a separation analysis in LUMi Reader®: (a) sedimentation behavior of the adhesive containing 0.2 wt % HAp nanorods sonicated for 2 min and (b) equivalent transmission-time curve at the height of 28 mm of LUMi Reader® tube.
Figure 8:
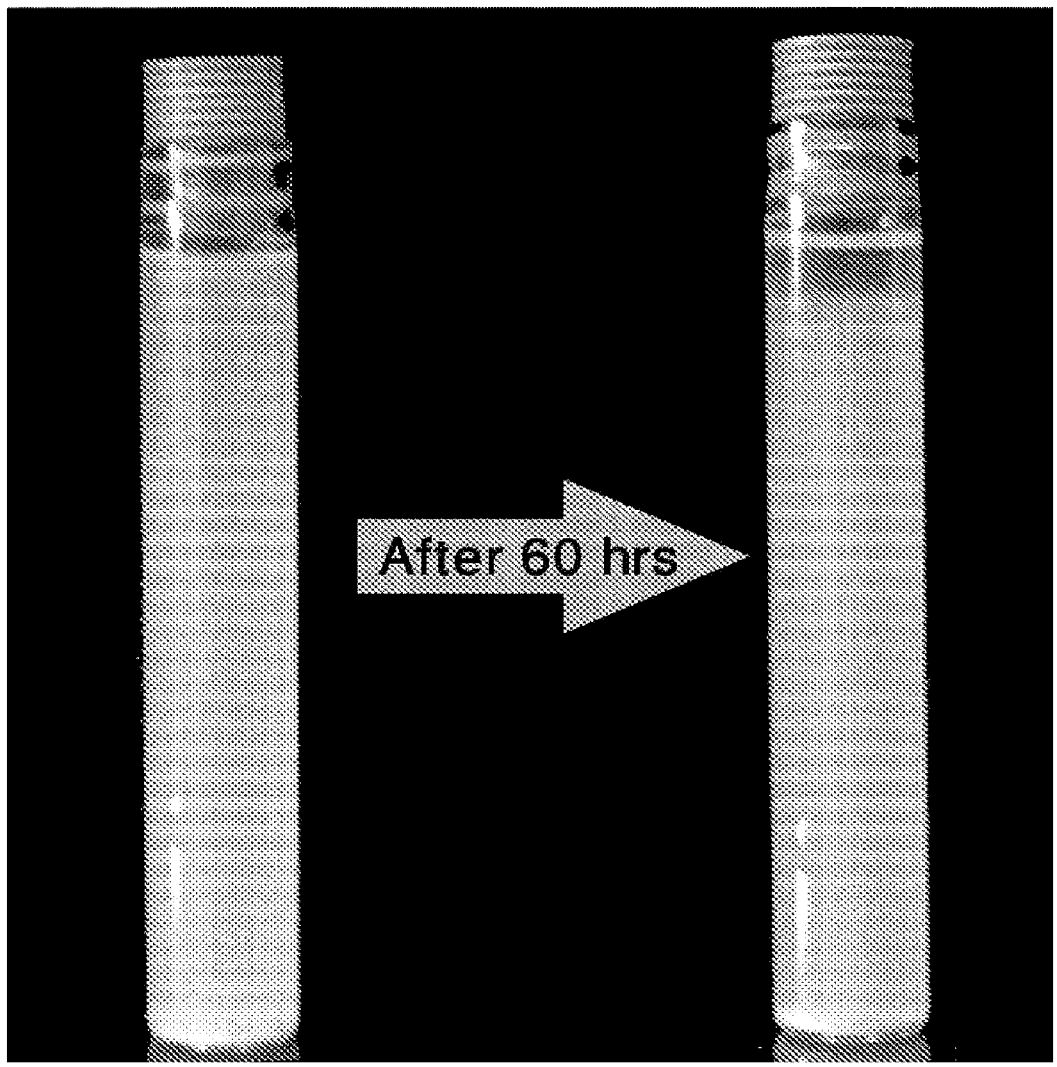
FIG. 8 is a visual observation of HAp nanorods dispersed in the dental adhesive, for immediately after sonication (left tube) and after 60 hours (right tube) indicating the high dispersion stability of nanorods in the adhesive solution.

Monitoring of colloidal stability is performed for 60 h using visible light with intensity of 100%. FIG. 7 presents the LumiReader® dispersion analysis which shows that even after 60 hours, the nanorods are not settled in the adhesive containing 0.2 wt % HAp nanorods. The figure indicates that synthesized hydroxyapatite nanorods have high colloidal stability in dental resin and remain stable for a long time. Visual observations also confirmed the high colloidal stability of the filled adhesive (FIG. 8).

In fact, the synthesized nanorods exhibit a low tendency for agglomeration when mixed with adhesive resin which might be related to the surface charge of the nanorods. In order to investigate this hypothesis, zeta potential measurement is carried out. In fact, the zeta potential is the electrical charge of particles surface which provides information about the stability of the colloidal systems. However, a threshold value for determining the stability of a suspension is not equal for dissimilar particles and the relative zeta potential is only used to compare the colloidal stability of homologous particles in the same media.

The hydroxyapatite nanoparticles, synthesized by solvotreatment method, show a low colloidal stability so that sedimentation is completed after about 2 h (Sadat-Shojai M., Preparation of Hydroxyapatite Nanoparticles: Comparison Between Hydrothermal and Solvo-Treatment Processes and Colloidal Stability of Produced Nanoparticles in a Dilute Experimental Dental Adhesive, *J. Iran Chem. Soc.* 20096(2): 386-392). These nanoparticles are used to compare the zeta potential of the suspensions containing the particles.

Zeta potential measurements are performed using an electrophoretic technique. Samples are placed in a clear disposable zeta cell that acted as the measurement chamber of the electrophoresis instrument (Zetasizer Nanoseries ZS, Malvern Instruments, UK) and then the external DC voltage at the constant value of 100 V is applied. The colloidal stability is determined by measuring electrophoretic mobility of the dispersed particles in the applied electric field. The electrophoretic mobility measurements are then converted into $\zeta$-potential values using Helmholtz-Smoluchowski. The reported values for $\zeta$-potential is the average of at least six measurements.

A zeta potential of −11.4 m V is obtained for the as-synthesized HAp nanorods, which indicates that the surface charge of nanorods is negative and relatively higher than that of spherical nanoparticles synthesized in our previous study (−5.52 mV). The spherical nanoparticles are settled in the same adhesive solution in 2 hrs. The higher zeta potential represents the higher surface charge which protects the particles from aggregation resulting in a more stable dispersion of the nanorods in the dilute adhesive solution.

Figure 9:
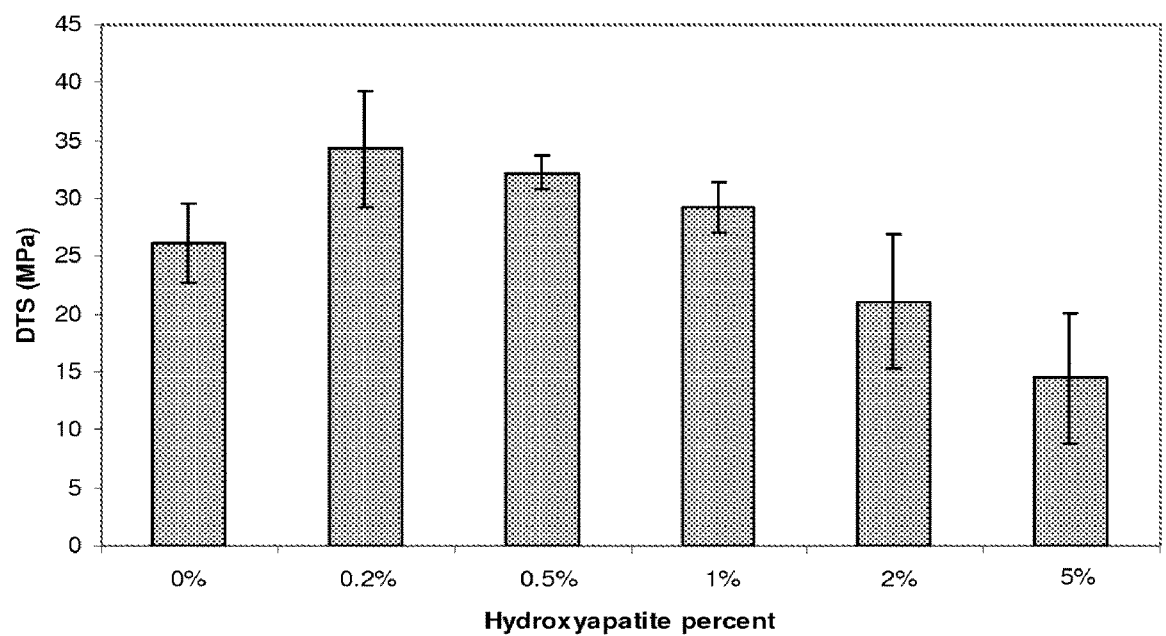
FIG. 9 is the results of diametral tensile strength (DTS) of the adhesives containing different percentages of HAp nanorods. The vertical bars represent the values of the standard deviation.

Diametral tensile strength (DTS) test is performed adopting the procedure of ANSI/ADA specification No. 27 for light cure resins. The results are analyzed and compared using one-way ANOVA statistical analysis and the Tukey test at the significance level of 0.05. The results show that the diametral tensile strength is increased for the sample containing 0.2-0.5 wt % of filler to the maximum value of 34 MPa and then decreased with the increasing filler content (FIG. 9) ($p<0.05$). These findings suggest a strong interaction between matrix and fillers. The drop of tensile strength after 0.5 wt % of filler content might be related to the presence of filler agglomerates as defect points and to the incomplete curing of the adhesive.

In thermoset systems, the physical and mechanical properties are strongly influenced by the degree of curing which reflects the crosslink density of the systems. In photocuring systems, the curing process depends on the irradiation energy received by the photoinitiator system and its further decomposition to active species. Penetration of light beam in the filled systems is determined by transparency of the matrix resin and fillers towards the irradiation wavelength and the difference between the refractive indices of the matrix and the filler.

Hydroxyapatite is opaque against visible light and when added to the adhesives adversely affect the curing reaction. To determine the effect of filler content on the curing efficiency of the adhesives, depth of cure is measured according to the ISO 4049 (2000) standardized technique.

The Cure depth measurements show a dramatic decrease in depth of cure ($p<0.05$) with the increase of hydroxyapatite content in the adhesives, which is attributed to the high opacity of the nanorods.

Figure 10:
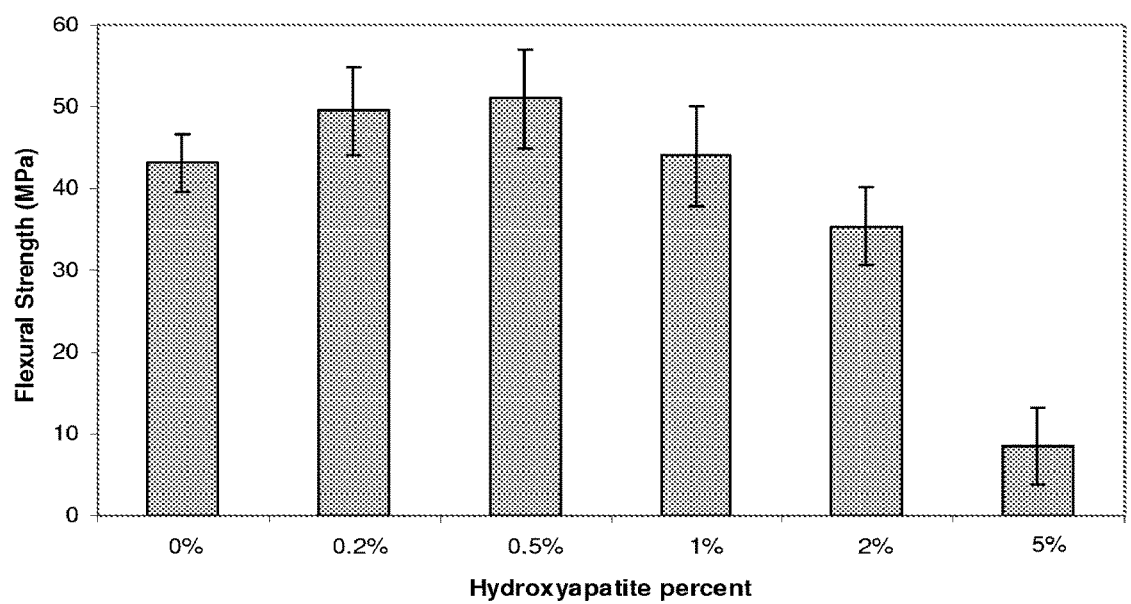
FIG. 10 is the results of flexural strength of the adhesives containing different percentages of HAp nanorods. The vertical bars represent the values of the standard deviation.

The flexural strength of the unfilled and HAp-filled adhesives is measured according to the ISO 4049 (2000) standard method (FIG. 10). The flexural strength increases when the nanorods are incorporated into the adhesive up to 0.5% by wt and then decreases steeply with increasing the filler content. The decrease in the flexural strength after a maximum value of 51 MPa is attributed to the reduction of cure depth of matrix upon increasing of the opaque filler.

Figure 11:
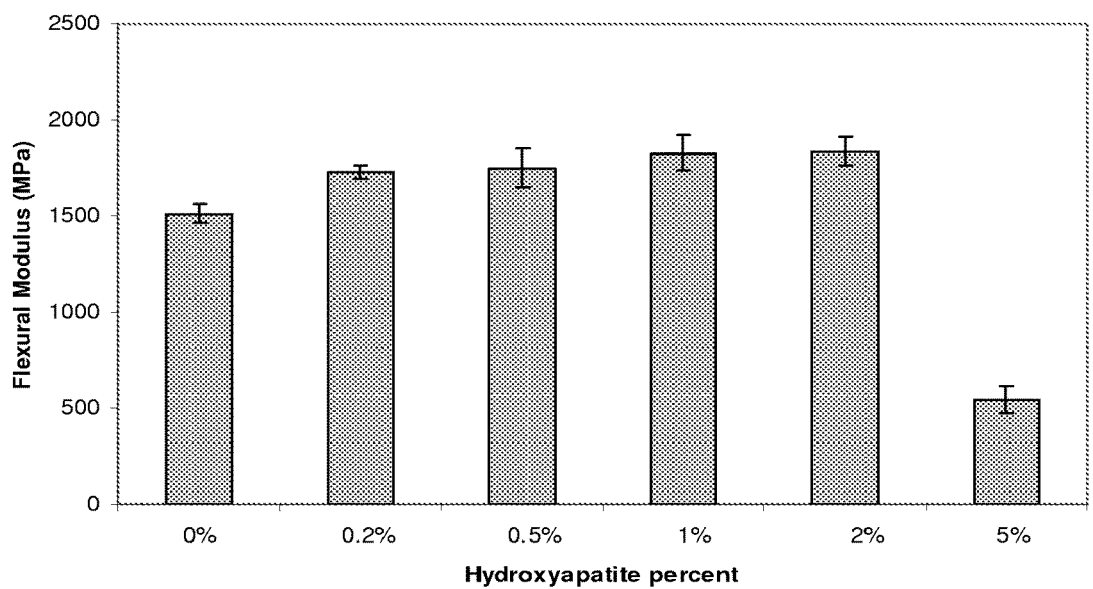
FIG. 11 is the results of flexural modulus of the adhesives containing different percentages of HAp nanorods. The vertical bars represent the values of the standard deviation.

Moreover, the agglomeration of HAp nanorods at higher filler loadings could aggravate the matter and give rise to the local defects that reduce the flexural strength. Generally, the fillers in the polymer matrix act as reinforcing materials and enhance the modulus of the matrix. FIG. 11 illustrates the flexural modulus of HAp-filled adhesives, which shows that the mean value increases non-significantly ($p>0.05$) with the increasing filler content and then decrease significantly with the adhesive containing HAp nanorods at 5 wt %. Similarly, the reduction of modulus is attributed to the agglomeration of HAp particles in the polymer matrix and incomplete curing of system.

Considering the mechanical properties, it can be concluded that improved properties are obtained in adhesives with filler content of less than 0.5 wt. %. This suggests that the defect points, arising from agglomeration of filler particles or incomplete curing of matrix, are minimized at the low filler contents. SEM examination of fractured surfaces reveals a rough surface within fracture cross-section of the adhesive containing 0.2 wt. % of filler, while the fracture surface of unfilled adhesive at the same magnification shows a smooth surface.

Topography of fracture surface is an indication of the fracture mechanism. Therefore, the improved mechanical properties of the adhesive system at 0.2-0.5 wt. % filler contents might be, in part, discussed considering the fracture surface topography. An uneven surface could be representative of higher energy dissipation during the fracture and crack propagation. Moreover, uniform distribution of filler particles in filled system has always been the goal of mixing processes.

Figure 12:
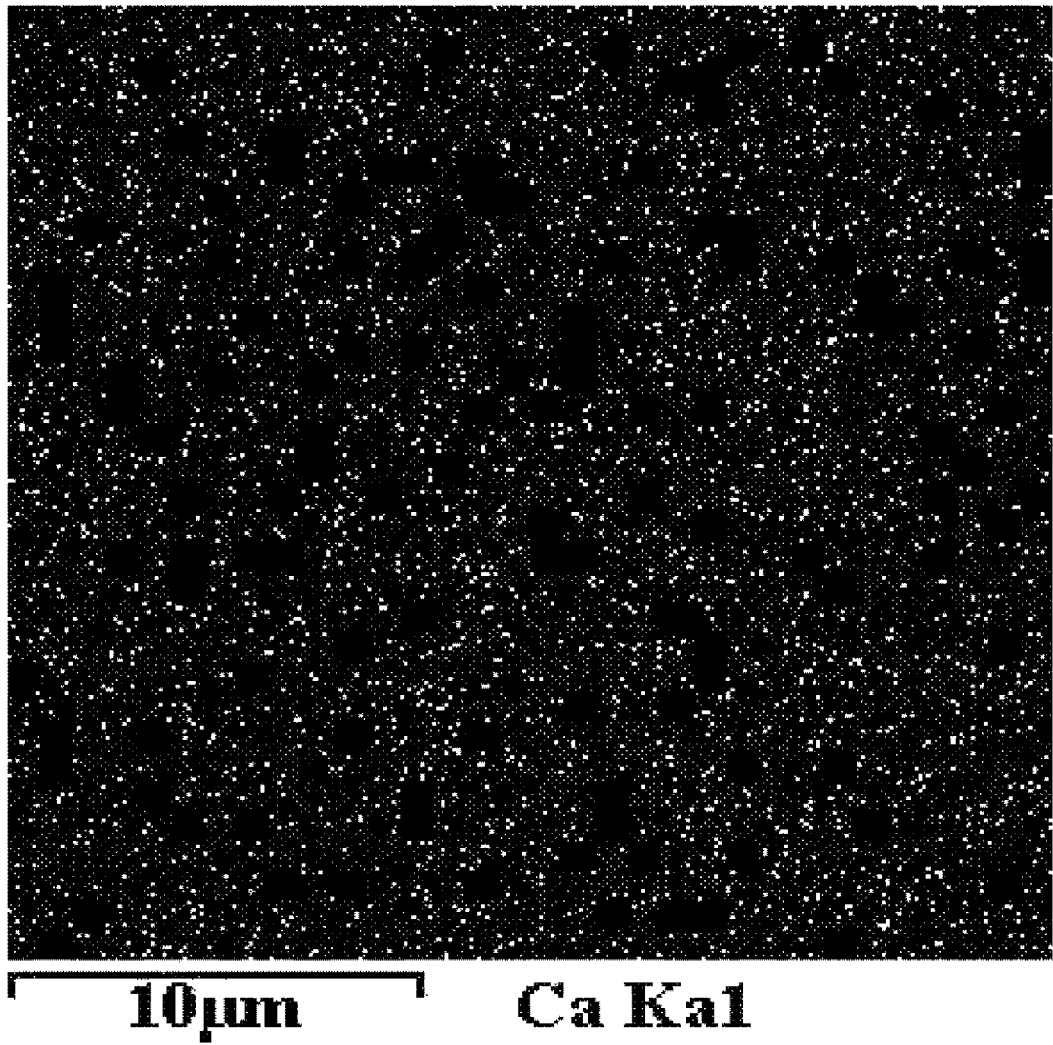
FIG. 12 is the EDX-calcium mapping image of the adhesive system containing 0.5 wt. % HAp nanorods. The bright spots show the distribution of the HAp nanorods in the adhesive.

FIG. 12 illustrates Energy Dispersive X-ray (EDX)-mapping of a specimen containing 0.5 wt % hydroxyapatite particles. The bright spots representing calcium confirm the homogeneous dispersion of the HAp particles in the polymeric matrix. The figure confirms the homogeneous dispersion of the nanoparticles in the adhesive resin matrix.

Higher and durable bond strength to tooth structure is the goal of restorative materials. The bond strength is measured with different methods among which microshear bond strength test is a simple and reliable method.

In the embodiments disclosed herein, forty-nine extracted caries-free human premolars are washed under running water stored in formaldehyde 12% solution for 1 week. The teeth are then cleaned from any soft tissues and transferred into the sodium chloride 0.9% sterile solution for up to 2 months. The superficial enamel is removed from the occlusal surface of the teeth using a trimmer. The crowns are then sectioned perpendicular to the long axis using a water-cooled slow-speed diamond disk sectioning machine to obtain two 2 mm thick dentin slices from each tooth. The flat surface of each slice is then polished with 600 and 1000 grit silicon carbide papers under running water to create a homogeneous smear layer. Ninety-eight prepared dentin slices are randomly divided into seven experimental groups and then treated with the adhesive systems according to the following procedures:

In groups 1-6, the exposed flat occlusal dentin surface is etched with the etching gel for 15 s, rinsed with water and blot dried to avoid the over drying of the dentin surface. The bonding agents containing 0, 0.2, 0.5, 1, 2 and 5 wt % HAp nanorods are applied using a micro-brush and their solvents are gently evaporated using a low pressure air stream until a homogeneous shiny layer is observed on the surface.

In group 7, the Single Bond 2 is applied according to the manufacturer's instruction. The adhesive layer is cured using the light-curing unit for 10 s.

Silicone tubes with 1.0 mm height and 0.8 mm internal diameter are placed on a glass slide and filled with restorative composite paste. The tubes are then transferred on the treated dentin surfaces and then irradiated for 40 s. After waiting for 5 min, the specimens are immersed in deionized water for an hour at room temperature and the silicone tubes are then removed using a surgery blade. Having stored at 37° C. for 1 week, each tooth slice is attached to the testing apparatus with a cyanoacrylate adhesive and is tested in the universal testing machine. A thin steel wire with 0.2 mm diameter is looped around each resin cylinder making contact with the lower half circle of the cylinder and touching the tooth surface. The force is then applied at a crosshead speed of 1 mm/min until failure occurred. The maximum load required to detach the cylinders from the tooth surface divided by the bonded area is recorded as the microshear bond strength.

The average of at least 10 repeats is reported. The results of microshear bond test (FIG. 13) show that the bond strength increased significantly to the maximum value of 22 MPa for the specimen containing 0.2 wt.% nanorod and then steeply decreased with increasing the filler content ($p<0.05$). The increase in bond strength might be explained by the fact that the nanofillers can reinforce the adhesive layer at the resin-dentin interface. Although utilizing hydroxyapatite nanoparticles has been reported to results in dental composites with undesirable performance due to its poor mechanical properties and high water uptake, our invention indicate that the use of HAp nanorods in very low percentages provide adhesives with improved properties.

The high degree of crystallinity and high aspect ratio of the synthesized nanorods are of probable reasons. The higher mechanical properties observed for the adhesive containing 0.2-0.5 wt % nanorods favor the formation of adhesive resin tags with higher strength infiltrated into the dentinal tubules providing strong micromechanical interlocking in the resin-dentin interface.

Figure 13:
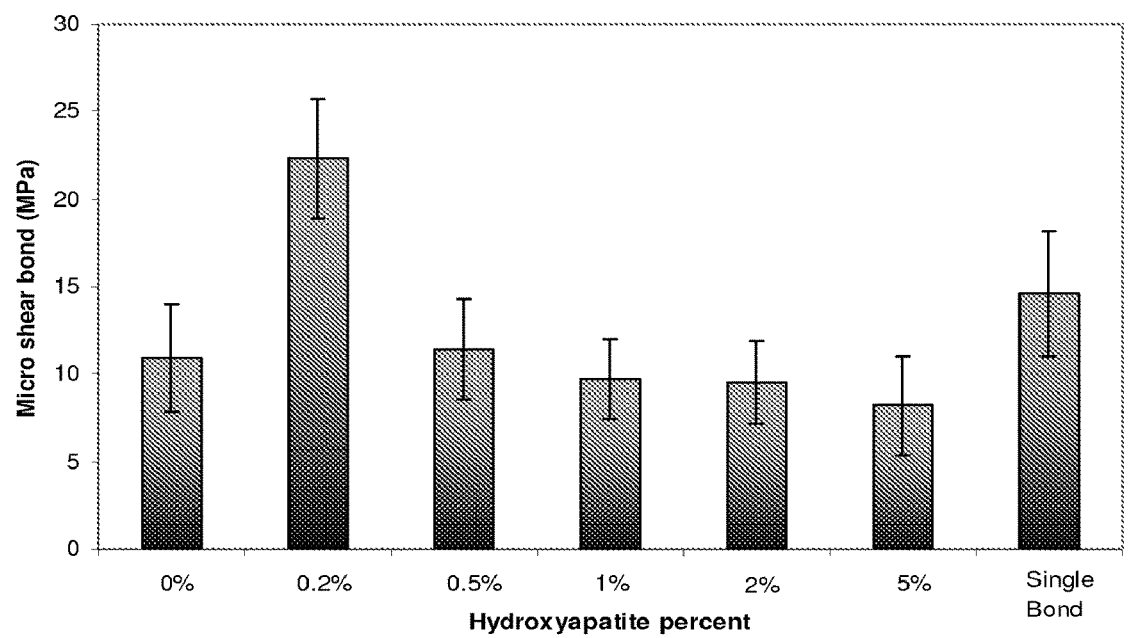
FIG. 13 is the results of microshear bond strength of the adhesives containing different percentages of HAp nanorods.

The reduction in microshear bond strength with the increasing filler content, as shown in FIG. 13, can be explained by the incomplete curing of the adhesive. Moreover, at higher filler contents, nanofillers tend to agglomerate. The accumulation of the fillers agglomerates on the top of the etched dentin substrate reduces the adhesive penetration into the dentinal tubules and hybrid layer of etched dentin forming a defective adhesive layer. SEM observations of resin-dentin interface in the microshear test specimens revealed mostly an adhesive failure in adhesive-dentin interface, although some mixed failure is also observed. It has been reported that HAp particles may biomineralized on the surface of chitosanlgelatin network films through hydrogen bonding between COOH, OH, and $NH_2$ groups of the film and OH group of the HAp crystals. Therefore it is likely to have the same interactions between HAp nanoparticles and collagen fibers of tooth. If the reaction happens, the incorporation of HAp may induce the remineralization of dentin at resin-dentin interface.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments disclosed herein can be practiced with modification within the spirit and scope of the appended claims.

What is claimed is:

1. A method of synthesizing hydroxyapatite nanorods (HAp) having purity, crystallinity, aspect ratio comprises:
   preparing an ionic solution of calcium ion ($Ca^{2+}$) by dissolving $Ca(NO_3)_2 \cdot 4H_2O$ salt in deionized water;
   preparing an ionic solution of phosphate ion ($HPO_4^{2-}$) by dissolving $(NH_4)_2HPO_4$ salt in deionized water;
   adding said phosphate ion solution in drop wise into said calcium ion solution with continuous stirring to obtain a reaction mixture;
   adjusting molar ratio of said calcium to said phosphate ion solutions, Ca/P to about 1.67;
   performing a chemical precipitation reaction of said reaction mixture under alkaline or acidic conditions to obtain a HAp precursor suspension in water wherein said alkaline condition is obtained by adding urea or ammonia solution to said reaction mixture;
   performing a hydrothermal treatment of said HAp precursor suspension in water in a 100 ml auto-clave at a temperature about 90 or 200° C. for 60 hrs to obtain suspension of HAp nanorods, washing said suspension of HAp nanorods in a deionized water;
   performing filtration of said suspension of HAp nanorods by centrifugation to obtain a nanosized Hap rods;
   and crushing said nanosized HAp rods to powder form.

2. The method according to claim 1, wherein said nanosized Hap rods is selected from a group consisting of nanosized HAp particles wherein said particles having different structural and morphological properties are obtained by varying the concentration of reactants, temperature, pH of said reaction mixture and further said reactants comprises of phosphate ion, calcium ion and urea.

3. The method according to claim 2, wherein said structural and morphological properties includes: diameter; length; aspect ratio and degree of crystallinity of said nanosized HAp rods.

4. The method according to claim 1, wherein said nanosized HAp rods has a diameter of about 35-320 nm.

5. The method according to claim 1, wherein said nanosized HAp rods has a length of about 850-1400 nm.

6. The method according to claim 1, wherein said nanosized HAp rods has an aspect ratio of about 24.

7. The method according to claim 1, wherein said nanosized HAp rods has crystallinity of about 73%.

8. A dental adhesive composition comprising:
   0.2-0.5 wt % of nanosized HAp rods;
   39.5-39.8 wt % of Ethanol;
   12 wt % of 1,6-bis-[2-methacryloyloxy ethoxycarbonylamino]2,4,4-trimethylhexane (UDMA);
   14 wt % of 2,2-bis[p-(2-hydroxy-3-methacryloxypropoxy)phenyl]propane (Bis-GMA);
   26 wt % of 2-hydroxyethyl methacrylate (HEMA);
   and 8 wt % of 2-Ethyl-2-(hydroxymethyl)-1,3-propandiol trimethacrylate (TMPTMA) mixed in given proportions to achieve a preset mechanical strength and a bond strength to dentin.

9. The composition according to claim 8 further comprising a photoinitiating system wherein said photoinitiating system is CQ/DMADME.

10. The composition according to claim 8, wherein the nanosized HAp rods are synthesized by
    preparing an ionic solution of calcium ion ($Ca^{2+}$) by dissolving $Ca(NO_3)_2 \cdot 4H_2O$ salt in deionized water;
    preparing an ionic solution of phosphate ion ($HPO_4^{2-}$) by dissolving $(NH_4)_2HPO_4$ salt in deionized water;
    adding said phosphate ion solution in drop wise into said calcium ion solution with continuous stirring to obtain a reaction mixture;
    adjusting molar ratio of said calcium to said phosphate ion solutions, Ca/P to about 1.67;
    performing a chemical precipitation reaction of said reaction mixture under alkaline or acidic conditions to obtain a HAp precursor suspension in water wherein said alkaline condition is obtained by adding urea or ammonia solution to said reaction mixture;
    performing a hydrothermal treatment of said HAp precursor suspension in water in a 100 ml auto-clave at a temperature about 90 or 200° C. 60 hrs to obtain suspension of HAp nanorods, washing said suspension of HAp nanorods in a deionized water;
    performing filtration of said suspension of HAp nanorods by centrifugation to obtain a nanosized Hap rods;
    and crushing said nanosized HAp rods to powder form.

11. The composition according to claim 8, wherein a synthesized HAp without any surface modification is colloidal stable in said composition.

12. The composition according to claim 8, wherein said preset mechanical strength is diametral tensile strength of at least 34 MPa.

13. The composition according to claim 8, wherein said preset mechanical strength is flexural strength of at least 51 MPa.

14. The composition according to claim 8, wherein 0.2 wt % of the HAp improves the bond strength to about 22 MPa.

* * * * *